(No Model.)
E. C. CREAMER.
CORN PLANTER.
No. 251,096. Patented Dec. 20, 1881.
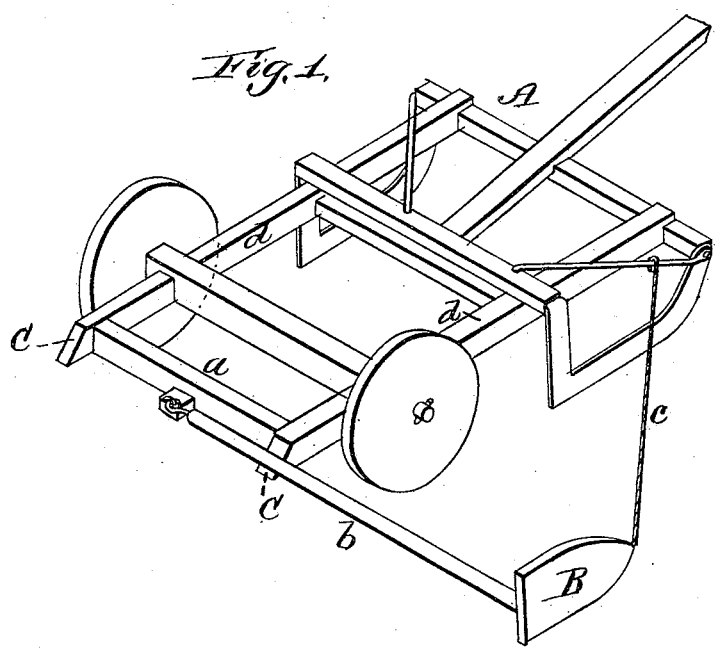
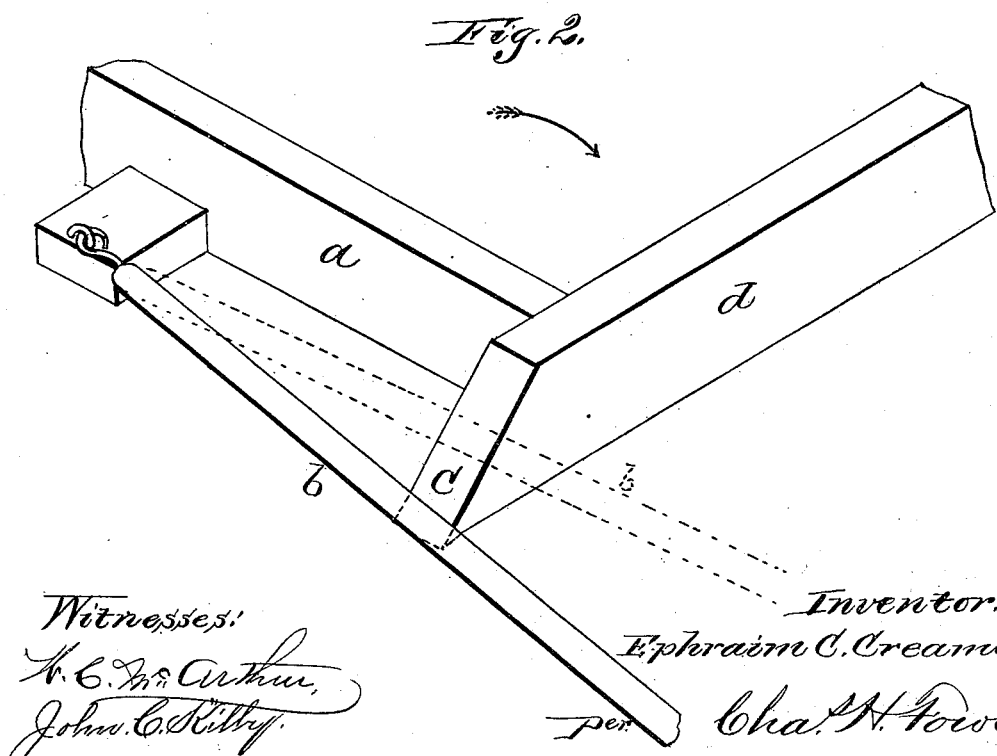
Witnesses:
N. C. McArthur
John C. Kilby
Inventor.
Ephraim C. Creamer,
per Chas. H. Fowler
Attorney.

United States Patent Office.

EPHRAIM C. CREAMER, OF TOLONO, ILLINOIS.

CORN-PLANTER.

SPECIFICATION forming part of Letters Patent No. 251,096, dated December 20, 1881.

Application filed September 29, 1881. (No model.)

*To all whom it may concern:*

Be it known that I, EPHRAIM C. CREAMER, a citizen of the United States, residing at Tolono, in the county of Champaign and State of Illinois, have invented certain new and useful Improvements in Corn-Planters; and I do hereby declare that the following is a full, clear, and exact description of the same, reference being had to the annexed drawings, making a part of this specification, and to the letters and figures of reference marked thereon.

Figure 1 of the drawings is a perspective view of my invention; and Fig. 2 is a similar view in detail, showing one of the incline planes and the pole of the marker in its natural position in full lines and in an elevated position in broken lines.

The present invention has relation to that class of corn-planters provided with a marker, which is designed for running over the unplanted land during the operation of distributing the seed, and so marking the land that by following the marks thus made the seed will be planted in parallel rows an equal distance apart.

The class of markers to which my invention applies, and which are in common use, consists in a marker pole or staff connected to the rear bar of the planter in such manner as will admit of the pole or staff being adjusted around from one side to the other of the machine at the ends of the rows, and also allow the outer or free end of the pole or staff to which the marker is connected to rise and descend freely, so as to accommodate itself to the inequalities of surface passed over. To insure the pole or staff being at right angles, or nearly so, to the line of draft, it is held by a rope connected to the marker and at some convenient point to the front part of the planter.

In the above construction of land-markers it was necessary for the driver to dismount from the planter and turn the guide-marker before he could turn the planter, and therefore it is the object of my invention to provide means whereby the planter can be readily turned before getting off to adjust the marker. This object I attain by the construction substantially as shown in the drawings and hereinafter described.

In the accompanying drawings, A represents the frame of a planter, to the rear bar, *a*, of which is suitably connected the pole or staff *b* of a marker, B, said marker having secured thereto a chain, cord, or rope, *c*, the opposite end being removably connected to any convenient part of the front of the frame A. These several parts, as have been hereinbefore referred to, are old and in common use, and therefore must be considered as forming no part of my invention, and further description of their operation is deemed unnecessary.

To facilitate the turning of the planter at the end of the row without the necessity of the driver dismounting in order to turn or elevate the marker, it is necessary to provide means by which the marker can be automatically elevated from the ground. This I accomplish by forming the rear ends of the side bars, *d*, of the frame A with incline planes C. Now, by turning the planter in the direction indicated by the arrow, Fig. 2, the incline plane at that side of the frame A will be brought in contact with the pole or staff *b* of the marker, and will elevate it to the position as shown in dotted lines, or until the marker B is raised from contact with the surface of the ground, thus allowing the planter to turn without the necesssity of the driver getting down from his seat to turn the marker. It should be understood that the pole or staff *b* comes in contact with the incline planes C only when the planter is being turned, or unless it vibrates considerably, which is only the case while in the act of turning.

I do not desire to be understood as confining myself to the incline planes on the side beams, *d*, as a board may be substituted inclined at its ends, as the essential and important feature of my invention is the raising of the marker off the ground or from contact therewith automatically by the turning of the planter.

Having now fully described my invention, what I claim as new, and desire to secure by Letters Patent, is—

1. The combination, with the frame of a corn-planter and a guide-marker connected to the rear end thereof, of means, substantially as shown and described, for automatically raising the marker from contact with the ground during the process of turning the planter, substantially as and for the purpose set forth.

2. In a corn-planter, the combination, with the marker B, and pole or staff b, connected to the rear of the frame A and to the front thereof by cord, chain, or rope c, of the incline planes C, substantially as and for the purpose specified.

In testimony that I claim the above I have hereunto subscribed my name in the presence of two witnesses.

EPHRAIM C. CREAMER.

Witnesses:
  ROBERT A. BOWER,
  WILLIAM T. BOWER.